June 7, 1938.  E. C. STAUFFER  2,119,606
DOMESTIC HEATING BOILER
Filed Aug. 23, 1937   2 Sheets-Sheet 1
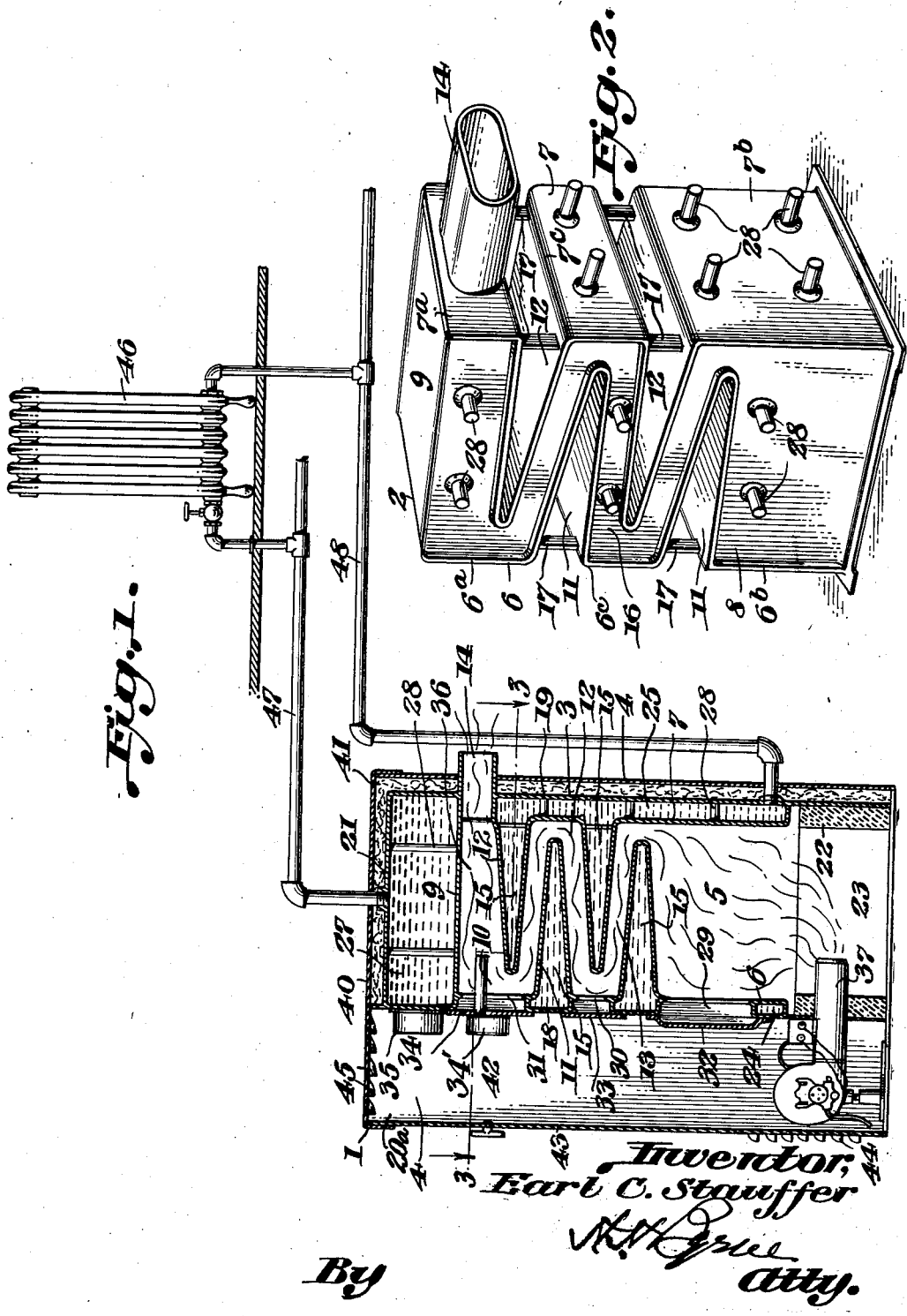

June 7, 1938.  E. C. STAUFFER  2,119,606
DOMESTIC HEATING BOILER
Filed Aug. 23, 1937  2 Sheets-Sheet 2
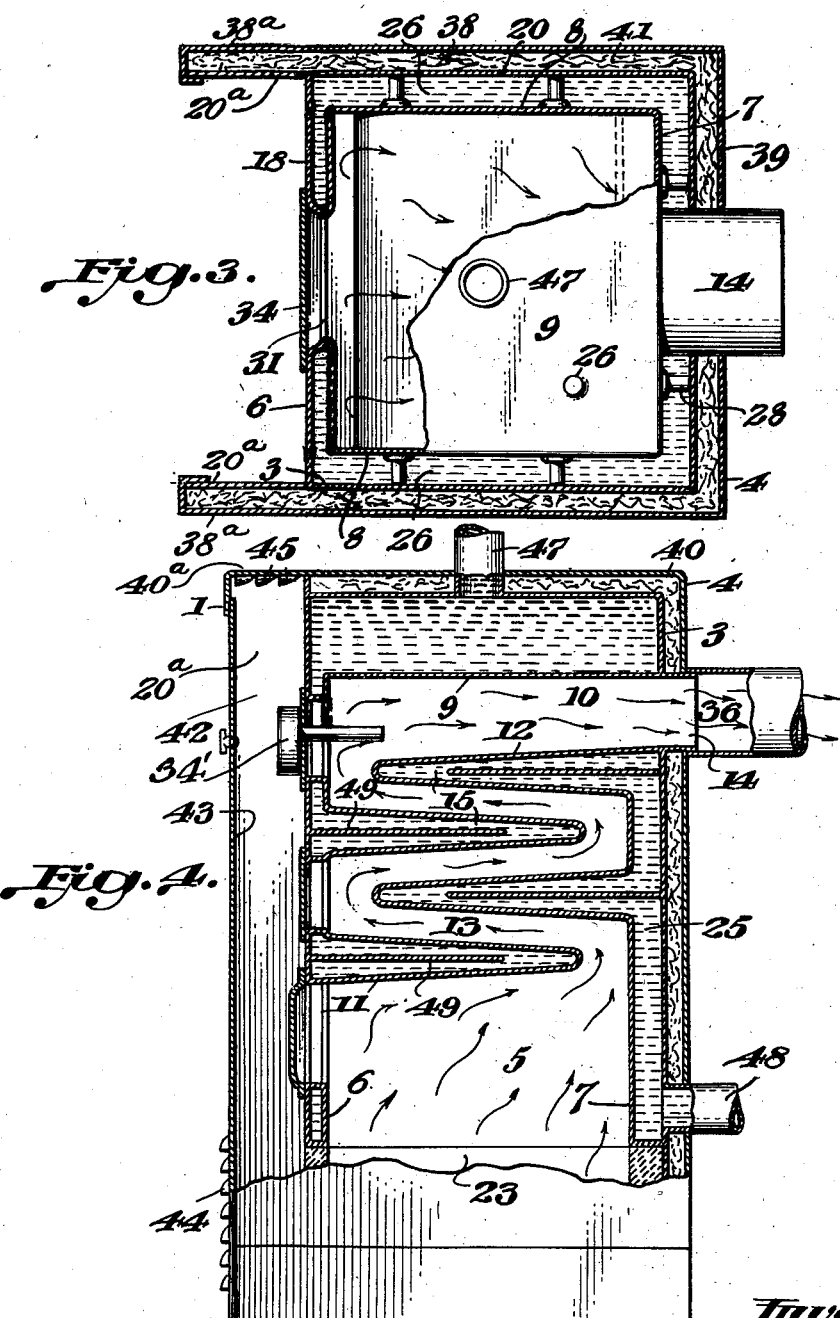
Inventor,
Earl C. Stauffer
By  Atty.

Patented June 7, 1938

2,119,606

UNITED STATES PATENT OFFICE 2,119,606

DOMESTIC HEATING BOILER

Earl C. Stauffer, Lancaster, Pa.

Application August 23, 1937, Serial No. 160,543

10 Claims. (Cl. 122—173)

This invention relates to boilers of the domestic heating type, and particularly to domestic steel boilers of that type wherein the combustion chamber or fireplace is located below the water body and the courses of flow of both the water and products of combustion are more or less generally in an upward direction.

One object of the invention is to provide a sheet steel boiler of this type which is smaller and much more compact for equivalent heat generating surfaces than boilers of the kind heretofore in use, and which is particularly adapted for use in homes and establishments requiring a compact unit occupying a minimum of floor space and small and compact enough to pass through doorways and apertures of ordinary homes as a unit.

Another object of the invention is to provide a domestic steel boiler having a novel construction and arrangement of heat transmitting and flow surfaces creating within a comparatively small area a more extended range of travel of the water and products of combustion and more efficient degree of heat exchange therebetween, whereby a heater of small size but of high heating capacity may be produced.

Still another object of the invention is to provide a domestic steel boiler having a circuitous or zig-zag passage for the upflow of the products of combustion and arrangement of superposed water flow channels in said passage, the passage and channels being formed by superposed lapping or interlocking fluid and channel forming elements, whereby the arrangement is such as to make use of all of the available heat units of the flowing products of combustion to heat the water.

Still another object of the invention is to provide a novel conformation of the elements forming the passage for the flow of the products of combustion and the channels for the flow of the water whereby the products of combustion and water are governed in their courses of flow to cause both the water and the gas to travel horizontally and vertically and in opposite directions through portions of their courses of travel, by which a maximum heating action and utilization of all the available heat units of the products of combustion is obtained within a compact heating range.

Still another object of the invention is to provide a construction of sheet steel boiler body adapted to be made of a minimum number of sheet steel sections welded together, whereby a body which may be economically manufactured and which will uniformly expand and contract and which is proof against cracking may be produced.

Still another object of the invention is to provide a sheet steel boiler having an outer casing enclosing the boiler body and provided with a compartment extension to enclose the exposed portions of the burner and boiler inspection devices and controls, whereby these parts will be shielded and protected in shipment and in service, and whereby a boiler construction is produced allowing the boiler to be assembled in complete condition at the factory for shipment.

Still another object of the invention is to provide a novel construction and arrangement of compartment extension of the character described with means for circulating air to keep those portions of the burner which should be protected against excessive heat comparatively cool at all times while the burner is in service.

Still another object of the invention is to provide an arrangement of a heating coil exposed to the heat of the water in the boiler body whereby water may be heated for domestic purposes.

Still another object of the invention is to generally improve the construction and increase the efficiency of boilers of this type.

With these and other objects in view, the invention consists of the features of construction, combination and arrangement of parts, hereinafter fully described and claimed, reference being had to the accompanying drawings, in which:—

Fig. 1 is a front-to-rear vertical section through a domestic boiler constructed in accordance with my invention, showing the same as used in a heating system, one of the radiators and associated piping of which are shown.

Fig. 2 is a perspective view of the fabricated firebox body.

Fig. 3 is a sectional plan view of the boiler, the plane of section being substantially that indicated by line 3—3 of Fig. 1.

Fig. 4 is a view similar to Fig. 1 showing a modified construction of boiler.

Referring now more particularly to Figs. 1, 2 and 3 of the drawings, I designates a sheet steel boiler structure which comprises a firebox body 2 enclosed within a heavy sheet steel shell or casing 3 and a relatively thin walled outer insulating shell or casing 4. This boiler structure is of rectangular or oblong rectangular form and may be of any suitable size and heating capacity.

The firebox body 2 is of the design shown in Fig. 2 and consists of a unitary structure formed of sheet steel sections welded together. It is open at the base to provide a combustion chamber 5 and is formed of a front wall 6, a back wall 7, counterpart side walls 8 and a top wall 9. The lower portions of the walls 6, 7 and 8 form the combustion chamber 5, while the upper portions of these walls form with the top wall 9 an outlet flue chamber 10. Between the chambers 5 and 10 the walls 6 and 7 are formed with horizontally disposed sets of V-shaped projections 11 and 12, respectively, bent inwardly therefrom and extending the major portion of the distance between the respective walls. These projections, those 11 on the wall 6 extending rearwardly toward the wall 7 and those 12 on the wall 7 extending forwardly toward the wall 6, are disposed at different levels and alternate in arrangement with each other so as to form a circuitous or zigzag shaped passage 13 for the flow of the products of combustion from the chamber 5 to an outlet flue 14 connected with the wall 7 and communicating with the flue chamber 10 forming the uppermost or outlet branch of the passage 13. These projections 11 and 12 also form water channels or pockets 15 and serve as baffles to retard and govern the rate of flow of the combustion gases between the combustion chamber 5 and flue 14 so that all the available heat of the gases will be utilized to heat the water before discharge of the waste gases from the flue 14 to the chimney.

The sides of the passage 13, as shown, are closed by correspondingly shaped zig-zag or Z-shaped intermediate portions 16 of the side walls or plates 8, but the channels 15 are open at the sides and front or back of the body, as the case may be, for the flow of water forwardly, rearwardly, laterally or from side to side of the body and upwardly, during which the water is exposed to the heat of the combustion gases traveling in contact with the walls of the body and walls of the channels 15. In practice the walls of the body 2 formed as above described may be stamped or died out of sheet steel as separate pieces, each as a unitary piece where expedient, and then welded together to produce the body shown. A more convenient method of manufacture, however, is to make the walls 8 and 9 as unitary pieces and to form each wall 6 and 7 in two pieces and to then suitably weld the component parts together. For example, wall 6 may be formed as two pieces 6a—6b welded at point 6c, while wall 7 may be formed as two pieces 7a—7b welded at point 7c. In this way the walls 6 and 7 with their projections 11 and 12 may be more conveniently produced and the welding of the wall elements may also be conveniently effected to produce a body of maximum strength and durability at low cost. By thus forming the body of welded sections of sheet steel a type of body is produced which will expand and contract more uniformly than a cast metal body, which provides for a quicker and more intense heat exchange action, which will not crack, and which is less affected adversely by operating conditions than a cast metal body, and which besides possessing these advantages, may be constructed at less cost. Bracing stays 17 welded to the walls of the channels may be provided to sustain the same. The flue 14 may be formed and welded into place in any suitable manner.

The heavy sheet steel shell 3 comprises a front wall 18, a rear wall 19, side walls 20 and a top wall 21. These walls are formed of sheet steel sections welded to each other to form a complete casing about the body, and said walls extend below the combustion chamber part 5 of the body and are provided with a lining 22 of refractory material to form a firebox 23 in open communication with the combustion chamber. The wall 18 is also welded to plane faces and flanged out portions of the body wall 6 to form a front water leg 24, portions of which are in direct communication with the channels 15 of the projections 11. The walls 19, 20 and 21 are disposed in spaced relation to the similar walls of the body 2 to provide a rear water leg 25, side water legs 26 and a top water and steam reservoir chamber 27 which are in communication with each other and with the front water legs. The front, side and top walls of the body and inner shell may be held spaced and braced by stay bolts or rods 28 riveted or welded to said walls. In the wall 18 are formed doorways or access openings 29, 30 and 31, adapted to be closed by suitable doors 32, 33 and 34, and to give ready access to the combustion chamber and portions of the passage 13 for inspection, repairs or clean out purposse. A temperature indicator 35 may be mounted for inspection to show the temperature of the water in the chamber 27. The door or member 34 which gives access to the upper outlet branch 36 of the passage 13 may be in the form of a removable or outwardly displaceable temperature responsive burner control device 34' the thermo-sensitive element of which extends into the branch 36 and is exposed to the temperature of the combustion gases therein. This arrangement allows such control device to be placed at the front of the boiler instead of within the outlet flue 36, with obvious advantages. An oil or other type of burner 37 is suitably supported at the front of the base of the boiler with its torch or flame tube projecting into the firebox from which the products of combustion flow upward through the passage 13.

The outer casing 4 consists of welded or other rigidly connected side, rear and top walls 38, 39 and 40 spaced from the similar walls of the shell 3, the spaces therebetween being packed with suitable insulating material 41. These walls may also be secured to the walls of the shell 3 in any suitable manner. As shown, the side walls 20 of the shell 3 have front extensions 20a and the side and top walls 38 and 40 of the outer casing 4 have front extensions 38a and 40a which extensions of said walls of said casings project some distance in advance of the front wall 18 of the inner casing 3 to provide a front compartment 42 in which the burner and all the delicate indicators and controls are housed. By this means these parts may be protected from dust, dirt and injury in use and shipment, and such arrangement allows the entire boiler to be assembled at the factory or at an assembly plant and shipped as a unit in completed condition ready for installation to the user. The compartment 42 may be open at the front and provided with a suitable door or removable panel 43 for closing it. A feature of my invention consists in providing the bottom part of this door or panel with air admission openings or louvres 44 and the forward portion of the top wall 40 with air outlet openings or louvres 45 whereby under the heat in the compartment 42 a draft of air over the burner is induced at all times when the burner is in service to keep cool those portions of the burner and its controls which should desirably be kept cool. The outer casing serves as an insulating casing or enclosure to hold the insulating material in place and may be made of thinner sheet steel than the casing 3 and suitably finished to give an attractive appearance to the boiler structure. As the main walls of the compartment 42 are integral with the thick metal walls of the casing 3 a very strong compartment is provided to protect the oil burners and controls while the boiler is in transit.

Fig. 1 shows the application of the boiler in a hot water heating system of which one radiator 46 is shown connected by a supply pipe 47 with the water chamber 27 of the boiler and by a return pipe 48 with the rear water leg 25 of the boiler.

In the operation of the boiler it will be understood that the combustion gases generated by the burner flow upward through the combustion chamber 5 and passage 13 in contact with the surfaces of the water chambers 15, thereby heating the water therein, the spent gases discharging through the outlet flue 14 to the smoke stack. In their passage the gases take a circuitous or zig-zag path back and forth through the passage 13, the baffles or water chamber forming elements of which are so arranged as to sufficiently constrict the passage and retard the flow of gases to cause all of the available heat units to be absorbed by the baffles and water before the gases are finally discharged. The heating of the water in the water chambers will cause a circulation of the water through the chambers and between the same and the water legs, and in such circulation the water will flow horizontally, backwardly and forwardly of the boiler in the water chambers, as well as laterally of the boiler through the water chambers and between the side water legs, so that a highly efficient circulation of the water is obtained to secure rapid heating thereof to a maximum degree. The heating effect of the gases on the baffles and water is intensified, and the heat exchange action promoted and increased, by reason of the interlocking zig-zag arrangement of the sets of baffles, as well as by the fact that the individual water chambers are tapered between their outer and inner ends, such taper disposing the walls of the baffles in planes inclined to the horizontal so as to give an inclined plane effect causing the water to travel upwardly in addition to its varied directions of flow. This arrangement of the surfaces of the baffles also causes a close impingement of the hot gases against the same with a rubbing or wiping effect, by which the abstraction of heat from the gases and transmission of the same to the bodies of water in the baffles is further intensified and promoted. As a result, a very compact arrangement of the water heating surfaces may be employed for the utilization of all the available heat of the combustion gases during a comparatively short course of flow of the gases to effect the heating of the water to the highest possible degree within a very short period of time and in such manner as to absorb all the available heat before the gases are discharged. The boiler structure thus lends itself to the production of a domestic heater of high heat generating capacity, but which, in proportion to its heating capacity, is much smaller than heaters of equivalent heating capacity, and which therefore may be installed within a very small amount of installation space. The boiler is designed to operate at high efficiencies with both automatic and intermediate firing, and great economy in the use of fuel is obtained due to its structure in absorbing heat quickly and efficiently during the "running period" and conserving the heat from wasting away during the "off period." It will be obvious that as the boiler is constructed of sheet steel and eliminates the use of tubes, a more durable type of boiler is produced and one which, unlike boilers made of cast iron, will not crack or require the replacement of burnt out or leaky tubes or other leaky parts, whereby objections present in ordinary steel boilers are effectually overcome. As the heavy steel walls of the outer shell are extended to form a chamber or compartment in which the oil burner and controls are installed, these may be mounted, wired and tested at the factory and all controls applied and located in a common compartment, whereby the boiler may be shipped in complete condition to a user with all installations previously made under best working conditions.

Fig. 4 shows a slightly modified form of my invention in which the boiler structure is generally the same as that previously described, but in which fins or supplemental heating plates or water baffles 49 supported on the front and rear walls of the boiler body are provided and extended into the water chambers or baffles to increase the heat absorbing and transmitting surfaces of the boiler and to promote the circulation of the water. These fins or supplemental baffles may be used with advantage in certain sizes of boilers and under certain working conditions.

From the foregoing description, taken in connection with the drawings, the construction and operation of my improved domestic heating boiler will be readily understood and its advantages appreciated by those versed in the art without a further and extended description. While the structure disclosed is preferred, it will, of course, be understood that changes in the form, construction and arrangement of the parts may be made to suit varying conditions of service within the scope of the appended claims without departing from the spirit or sacrificing any of the advantages of the invention.

What I claim is:—

1. A transportable domestic heating boiler adapted to be pre-assembled and shipped as a heating unit ready for installation, comprising a boiler structure having sheet steel firebox and shell members in spaced relationship and defining a fluid heating compartment therebetween, an extension formed of substantially co-planar portions projecting from each of two oppositely disposed vertical walls of the shell and forming a rigid compartment offset from the boiler structure for the reception of control means and any exposed portions of a combustion unit to shield and protect the same during shipment and in service.

2. A transportable domestic heating boiler adapted to be pre-assembled and shipped as a heating unit ready for installation as such with a burner equipment, said unit comprising a boiler structure having sheet steel firebox and shell members in spaced relationship and defining a fluid heating compartment therebetween, an extension formed of substantially co-planar portions projecting from each of two oppositely disposed vertical walls of the shell and forming a rigid compartment offset from the boiler structure for the reception of control means and any exposed portions of a combustion unit to shield and protect the same during shipment and in service, control means mounted on the boiler and housed in said compartment, a combustion unit attached to the boiler and having a combustion portion extending into the firebox thereof, and a sheet metal casing enclosing the boiler, the combustion unit, and the control means.

3. A transportable domestic heating boiler adapted to be pre-assembled and shipped as a heating unit ready for installation comprising a boiler structure having sheet steel firebox and shell members in spaced relationship and defining a fluid heating compartment therebetween, an extension formed of substantially co-planar portions projecting from each of two oppositely disposed vertical walls of the shell and forming a rigid compartment offset from the boiler structure for the reception of control means and any exposed portions of a combustion unit to shield and protect the same during shipment and in service, and a sheet metal casing enclosing the boiler and said offset compartment.

4. A transportable, pre-assembled domestic heating unit comprising a boiler having sheet steel firebox and shell members in spaced relationship and defining a fluid heating compartment therebetween, an extension formed of substantially co-planar portions projecting laterally from each of two oppositely disposed walls of the shell and forming a rigid compartment for the reception of control means and any exposed portions of a combustion unit to shield and protect the same during shipment and in service, control means mounted on the boiler and disposed within said compartment, and a combustion unit housed in said compartment and attached to the boiler and having a combustion portion extending into the firebox thereof.

5. A transportable, pre-assembled domestic heating unit comprising a boiler having sheet steel firebox and shell members in spaced relationship and defining a fluid heating compartment therebetween, an extension formed of substantially co-planar portions projecting laterally from each of two oppositely disposed walls of the shell and forming a rigid compartment for the reception of control means and any exposed portions of a combustion unit to shield and protect the same during shipment and in service, control means mounted on the boiler and disposed within said last named compartment, a combustion unit housed in said last named compartment and attached to the boiler and having a combustion portion extending into the firebox thereof, and a sheet metal casing enclosing the boiler, the combustion unit, and the control means.

6. A transportable domestic heating boiler adapted to be pre-assembled and shipped as a heating unit ready for installation, comprising a boiler structure having sheet steel firebox and shell members in spaced relationship and defining a fluid heating compartment therebetween, and an extension integral with said shell member formed of parallel portions projecting laterally from the shell member and therewith forming a rigid compartment offset from the front of the boiler structure for the reception of control means and any exposed portions of a combustion unit to shield and protect the same during shipment and in service.

7. A transportable domestic heating boiler adapted to be pre-assembled and shipped as a heating unit ready for installation, comprising a boiler structure having sheet steel firebox and shell members in spaced relationship and defining a fluid heating compartment therebetween, an extension integral with said shell members formed of parallel portions projecting laterally from the boiler structure and therewith forming a rigid compartment offset from the boiler structure for the reception of control means and any exposed portions of a combustion unit to shield and protect the same during shipment and in service, and a sheet metal casing enclosing the boiler and the offset compartment.

8. A transportable, pre-assembled domestic heating unit comprising a boiler having sheet steel firebox and shell members in spaced relationship and defining a fluid heating compartment therebetween, extensions formed of substantially parallel members projecting along lines substantially contiguous with opposite portions of the shell and deriving substantial support therefrom and arranged to form a rigid compartment extending laterally of said boiler for the reception of control means and any exposed portions of a combustion unit to shield and protect the same during shipment and in service, and combustion means disposed in said compartment.

9. A transportable, pre-assembled domestic heating unit comprising a boiler including an inner fabricated sheet steel firebox having a bottom combustion chamber and an outlet for the discharge of spent products of combustion, a plurality of oppositely disposed horizontally extending projections arranged in overlapping relationship and extending substantially a major portion of the distance between the front and rear of the firebox and defining a circuitous path between the combustion chamber and the discharge opening, a sheet steel shell enclosing said firebox and forming a heating compartment therebetween in which the hollow projections are open and have free communication therewith throughout substantially their entire area, a relatively rigid extension formed of parallel members projecting along lines substantially contiguous with opposite portions of the shell and forming a compartment positioned laterally of said boiler for the reception of control means and combustion means to shield and protect the same during shipment and in service, and combustion means having a portion extending into the firebox at the combustion chamber thereof.

10. A transportable domestic heating boiler in accordance with claim 1 in which the firebox member is provided with a plurality of oppositely disposed horizontally extending projections arranged in overlapping relationship and extending substantially a major portion of the distance between the front and rear of the firebox and defining a circuitous path between the combustion chamber and the discharge opening of the firebox.

EARL C. STAUFFER.